United States Patent [19]
Park et al.

[11] Patent Number: 5,937,328
[45] Date of Patent: Aug. 10, 1999

[54] METHOD FOR CONTROLLING TRANSMISSION DATA FLOW IN SATELLITE COMMUNICATION

[75] Inventors: Hyun-Soo Park; Jae-Hoon Kim, both of Daejeon, Rep. of Korea

[73] Assignees: Electronics and Telecommunications Research Institute, Daejeon, Rep. of Korea; Korea Telecom, Seoul, Rep. of Korea

[21] Appl. No.: 08/840,283

[22] Filed: Apr. 14, 1997

[30] Foreign Application Priority Data

Nov. 16, 1996 [KR] Rep. of Korea ............... 96-54739

[51] Int. Cl.$^6$ .............. H04H 1/00; H04N 7/10; H04N 7/14
[52] U.S. Cl. ................ 455/3.2; 348/12; 348/13
[58] Field of Search ............... 455/3.2; 348/12, 348/13, 10, 7; 370/229, 230, 231, 232, 233, 234, 235, 236, 237; H04N 7/10, 7/14; H04H 1/00

[56] References Cited

U.S. PATENT DOCUMENTS 5,463,620 10/1995 Sriram ........................ 370/60
5,787,072 7/1998 Shimojo et al. .............. 370/231

*Primary Examiner*—Nathan Flynn
*Assistant Examiner*—Vivek Srivastava
*Attorney, Agent, or Firm*—Cohen, Pontani, Lieberman & Pavane

[57] ABSTRACT

A method for controlling transmission data flow in a satellite communication system is disclosed. The current status is notified to a main board of a central station and to a main board of a terminal station in accordance with the flow control buffering status of a satellite communication board of the central station, and thus, the main board of the central station commands a starting or a releasing of a flow control to a subscriber board of the central station. In accordance with the flow control buffering status of the subscriber board of the central station, its status is notified to the main board of the central station, so that the main board of the terminal station can start or release the flow control. In accordance with the flow control buffering status of the main board of the terminal station, its status is notified through a satellite communication board of the central station to the main board of the central station, so that the subscriber board of the central station can start or release the flow control. Thus the system grounding-down due to the flow controls of the network factors and due to the user data rush is prevented.

7 Claims, 15 Drawing Sheets

METHOD FOR CONTROLLING TRANSMISSION DATA FLOW IN SATELLITE COMMUNICATION

BACKGROUND OF THE INVENTION

1. Field of the Invention

The present invention relates to a method for controlling transmission data flow in a satellite communication system, in which when a plurality of terminal stations give and receive data through a central station, a possible data rush is prevented, so that the system can be operated in a stable manner.

2. Description of the Prior Art

Coming recently, the nations of the world have got rid of the ground network communications and broadcasting transmissions, and have entered into the satellite communication stage. Our nation also shot a satellite named "Mugungwha" in 1995, and the satellite is under test operation currently. Earlier than this, in 1994, an exclusively low speed data earth system VDS (VSAT Data System)-100 which was a data communication system resorting to a satellite was developed, and the system is in test service currently.

This exclusively low speed data earth station system is for searching data bases in industries, financial organizations, educational organizations and research institutes. Mostly, the exclusively low speed data earth station system is composed of one single central station and a plurality of terminal stations. If the data which are rushing from the plurality of terminal stations to the central station are not properly controlled, a serious problem can occur in the system operation.

In the most communication systems, the problem of the data flow controls is tackled by a communication protocol within the system. However, when the data are rushing congestingly as is unavoidable in the system, and when the contour of the system is changed, a data loss occurs due to the fact that another terminal station unrecognizingly sends data. This loss cannot be prevented.

SUMMARY OF THE INVENTION

The present invention is intended to overcome the above described disadvantages of the conventional technique.

Therefore it is an object of the present invention to provide a method for controlling transmission data flow in a satellite communication system, in which a memory (ROM) containing an applied program is directly inserted into each of the relevant boards of the central station and terminal stations, so that the flow of information can be controlled when changing the network constituents by the system operator in a satellite communication system, and that a system grounding-down due to a rush of user data can be prevented.

In achieving the above object, the method for controlling transmission data flow in a satellite communication system according to the present invention includes the steps of: storing a high buffer utility (HBU) (which occurs when the buffer data exceeds the threshold value) into a data base by a central station board upon receipt of it, and identifying a board which has sent the high buffer utility, so as to control the data flow of the board (first step); and initializing a relevant data base by the central station board upon receipt of a low buffer utility (LBU) when the buffer data has a value lower than the threshold value, and identifying the position of the board which has sent the low buffer utility, so as to control the data flow of the board (second step).

In the first step, in the case where the satellite communication board of the central station has sent a high buffer utility to a main board of the central station, a response signal for the high buffer utility is transmitted to the satellite communication board of the central station. Then the fact that a board flow control and a port flow control are being executed is notified to a subscriber interface board of the central station, so that any more data cannot be transmitted. Then a response signal for this fact is received from the subscriber interface board of the central station. In the case where the subscriber interface board of the central station has sent a high buffer utility to the main board of the central station, a response signal for the high buffer utility is sent to the subscriber interface board of the central station. Then the fact that a port data flow control is being executed is notified to the main board of the terminal station, so that any more data cannot be transmitted from the main board of the terminal station. In the case where the main board of a terminal station has transmitted a high buffer utility to the main board of the central station, a response signal for the high buffer utility is sent to the satellite communication board. Then the fact that a port flow control is being executed is notified to the subscriber interface board of the central station, and a response signal for this notification is received from the subscriber interface board.

Meanwhile, in the second step, in the case where the satellite communication board of the central station has sent a low buffer utility to the main board of the central station, a response signal for the low buffer utility is transmitted to the satellite communication board of the central station. Then the fact that a board flow control and a port flow control have been terminated is notified to the subscriber interface board of the central station, so as to make the data transmitted. Then a response signal for this fact is received from the subscriber interface board of the central station. In the case where the subscriber interface board of the central station has sent a low buffer utility to the main board of the central station, a response signal for the low buffer utility is sent to the subscriber interface board of the central station. Then the fact that a port flow control has been completed is notified to the subscriber interface board and to the main board of the terminal station, so that the transmission of data can be resumed. Then a response signal for this fact is received from the subscriber interface board. In the case where the main board of a terminal station has sent a low buffer utility through the satellite communication board to the main board of the central station, a response signal for the low buffer utility is sent to the satellite communication board. Then the fact that a port flow control has been completed is notified to the subscriber interface board of the central station. Then a response signal for this fact is received from the subscriber interface board of the central station.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
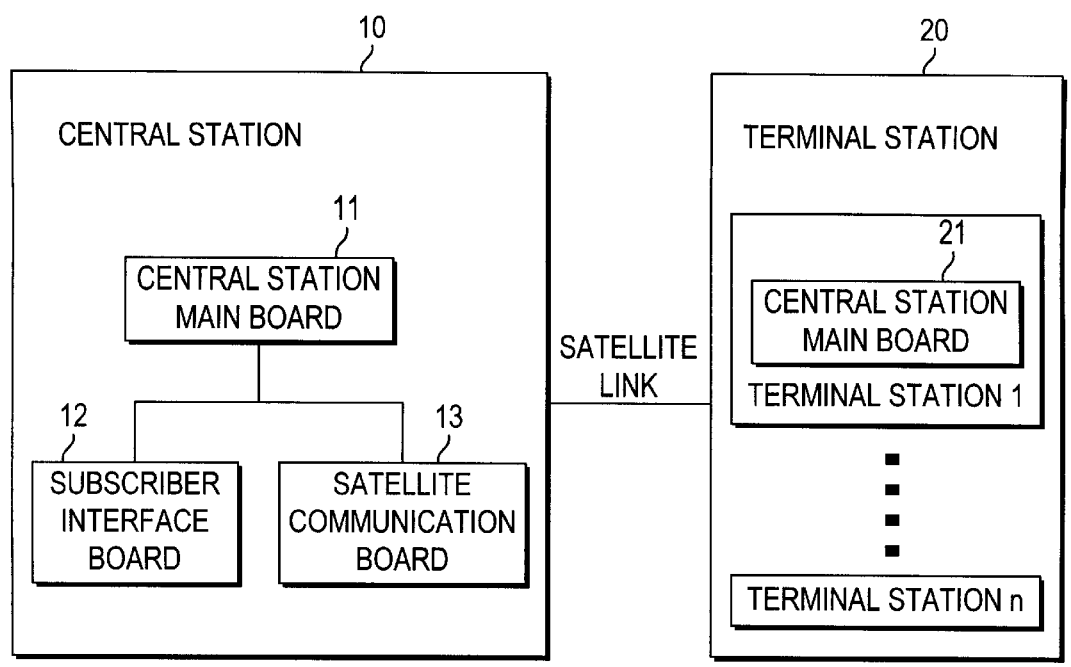
FIG. 1 is a block diagram showing the constitution of the satellite communication system to which the present invention is applied.

FIG. 1 is a block diagram showing the constitution of the satellite communication system to which the present invention is applied.

Referring to FIG. 1, in the satellite communication system, a central station 10 and a terminal station block 20 are connected together through a satellite link. The central station 10 includes: a central station main board 11, a subscriber interface board 12 and a satellite communication board 13. The terminal station block 20 includes a plurality of terminal stations each including a terminal station main board 21.

The central station 10 is loaded with user data bases and a protocol. The central station main board 11 initializes and executes overall controls on the operating state of all the boards of the central station 10 and all the terminal stations 20. The subscriber interface board 12 carries out an interfacing with the users.

The satellite communication board 13 receives the data from the interface board 12 and from the terminal stations 20 so as to transmit them to subscriber facilities which are connected to the subscriber interface board. The terminal station 20 processes a maintenance information and provides user services.

FIGS. 2a to 2f are flow charts showing the flow control method according to the present invention. Here, the message executing sequences by the respective boards are illustrated for the case where a high buffer utility (HBU) is received when the flow control buffers of the respective boards show a value above a certain level, and for the case where a low buffer utility (LBU) is received when the flow control buffer show a value below a certain level.

Figure 2A:
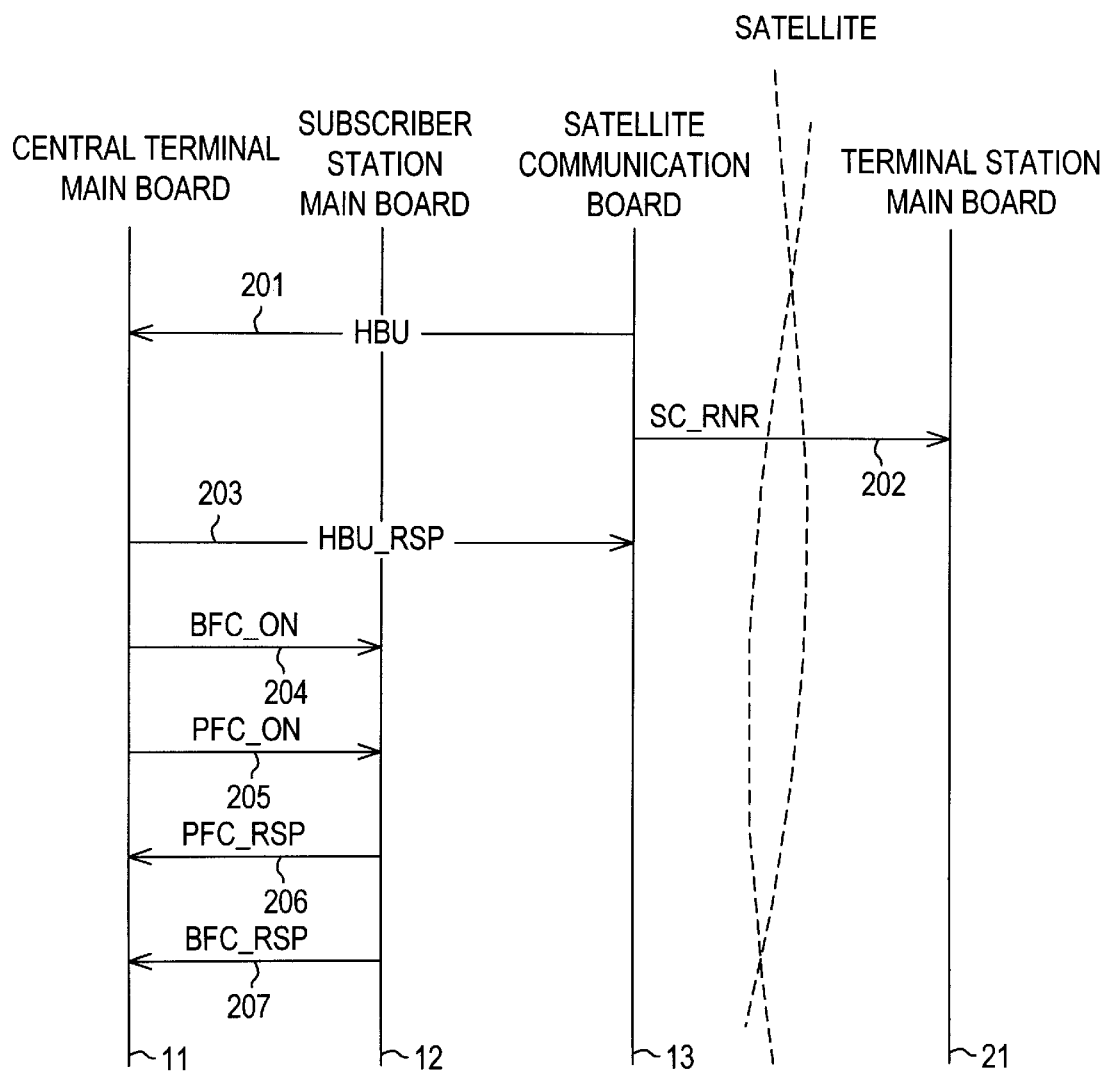
FIGS. 2a to 2f are flow charts showing the flow control method according to the present invention.

FIG. 2a is a message flow chart applied to the case where the satellite communication board 13 of the central station 10 has requested for an HBU flow control.

Referring to FIG. 2a, when the data of a buffer exceeds a certain threshold value, the satellite communication board 13 transmits an HBU message to the main board 11 of the central station 10 so as to notify that the level of the flow control buffer has reached a value above a reference level. Then the satellite communication board 13 transmits a satellite channel receive-not-ready message (SC-RNR) to the main board 21 of the terminal station which is capable of controlling the flow of the terminal station 20, to notify that the data should not be transmitted to the satellite link (202).

Upon receipt of the high buffer utility message HBU, the main board 11 of the central station transmits a response HBU-RSP to the satellite communication board 13 (203). Then the main board 11 transmits a board flow control message BFC-ON to the subscriber interface board 12 of the central station which has a user communication protocol (204). Further, the main board 11 transmits a flow control message PFC-ON to the respective user ports (205).

Then the subscriber interface board 12 of the central station notifies to the respective communication protocols operating within its own board that the data cannot be transmitted due an occurrence of a problem. Then the board 12 transmits a response message PFC-RSP for the port flow control message PFC-ON to the main board 11 of the central station (206). Then the board 12 transmits a response message BFC-RSP for the board flow control message BFC-ON to the main board 11 of the central station (207).

Figure 2B:
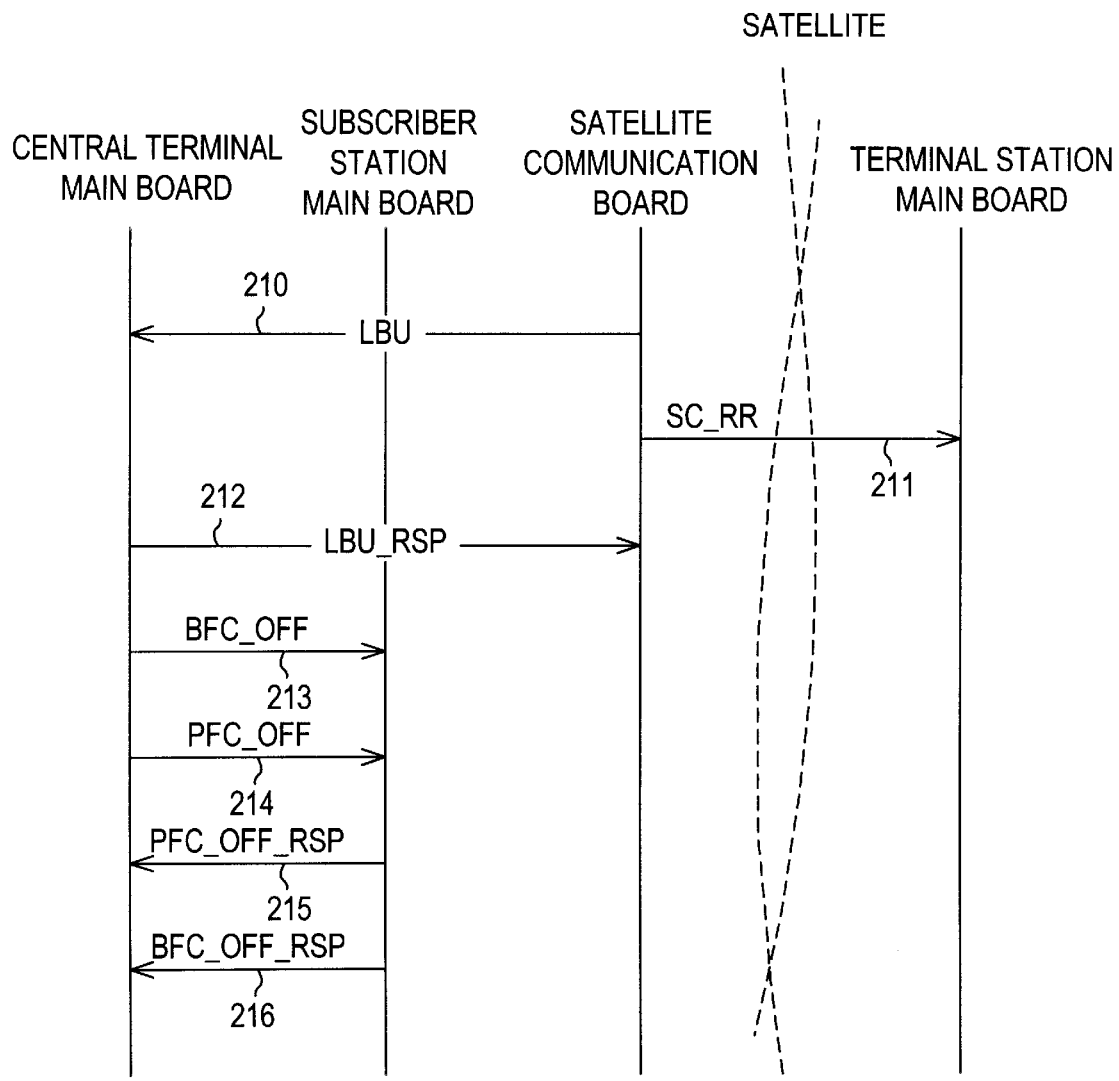

FIG. 2b is a message flow chart for the case where the satellite communication board 13 of the central station has requested for a low buffer utility (LBU) flow control.

Referring to FIG. 2b, when the data of a buffer has dropped to below a certain threshold value, the satellite communication board 13 transmits a low buffer utility LBU to the main board 11 of the central station, notifying that the level of the flow control buffer has dropped to below the reference level (210). The satellite communication board 13 also transmits a satellite channel receive-ready message SC-RR to the main board 21 of the terminal station having the capability of controlling the flow of the terminal station 20, thereby notifying that the data can be transmitted to the satellite link (211).

Upon receipt of the low buffer utility LBU, the main board 11 of the central station sends a response message LBU-RSP for the LBU message to the satellite communication board 13 (212). Then the board 11 transmits a board flow control non-execution message BFC-OFF to the subscriber interface board 12 of the central station which has the user communication protocol (213). Then the board 11 transmits a port flow control non-execution message PFC-OFF to the respective user port.

Then the subscriber interface board 12 of the central station notifies that the data transmission can be resumed owing to the solution of the problem, to the respective communication protocols which are operating within its own board. Then the board 12 transmits a response message PFC-OFF-RSP for the port flow control non-execution message PFC-OFF to the main board 11 of the central station (215). Then the board 12 transmits a response BFC-OFF-RSP for the board flow control non-execution message BFC-OFF (216).

Figure 2C:
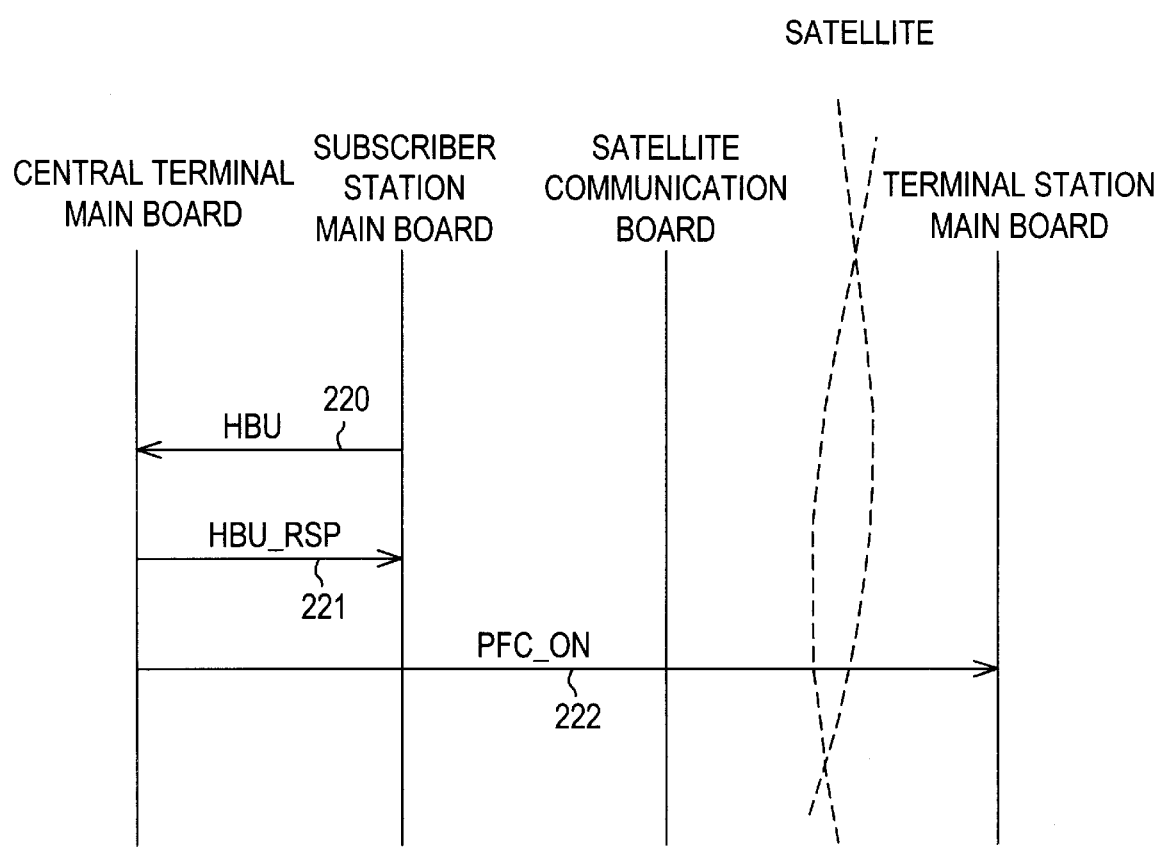

FIG. 2c is a message flow chart for the case where the subscriber interface board 12 of the central station has requested for an HBU flow control.

Referring to FIG. 2c, if the data of the buffer shows a value above a certain threshold value, the subscriber interface board 12 of the central station transmits an HBU message to the main board 11 of the central station, notifying that the level of the flow control buffer has reached above the reference level (220).

Upon receipt of the HBU message, the main board 11 of the central station transmits a response HBU-RSP for the HBU message to the subscriber interface board 12 of the central station(221). Then the board 11 transmits a flow control message PFC-ON to the main board 21 of the terminal station 20 having a flow control capability (222), notifying that a problem has occurred in the flow control buffer of the subscriber interface board 12 of the central station, and that any more data should not be transmitted.

Figure 2D:
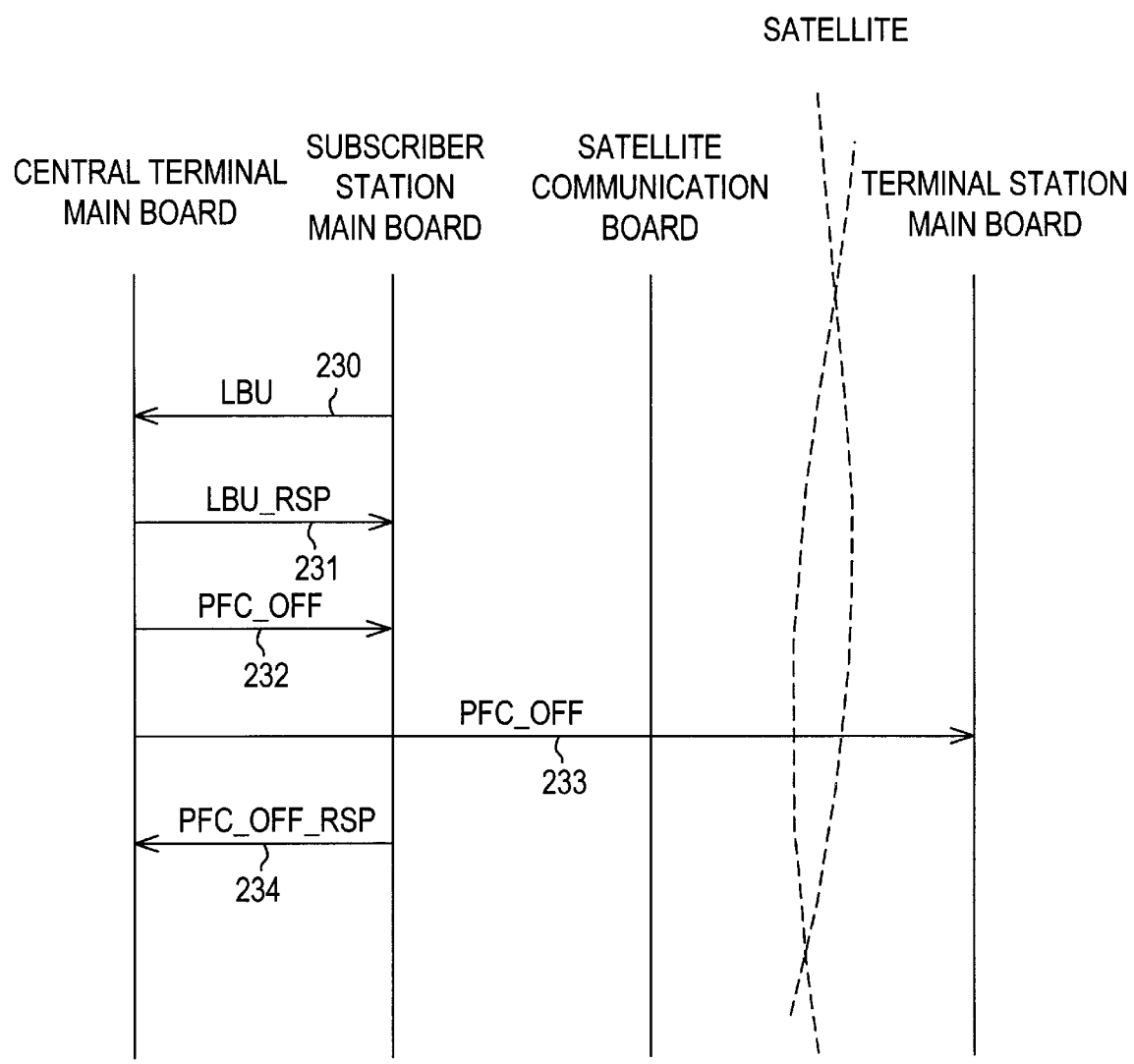

FIG. 2d is a message flow chart for the case where the subscriber interface board 12 of the central station has requested for a low buffer utility (LBU) flow control.

Referring to FIG. 2d, if the data of the buffer drops to below a certain threshold value, the subscriber interface board 12 transmits a low buffer utility LBU to the main board 11 of the central station, notifying that the level of the flow control buffer has dropped to below the reference level (230).

Then, upon receipt of the message LBU, the main board 11 of the central station transmits a response message LBU-RSP for the LBU message to the subscriber interface board 12 (231). Then the main board 11 of the central station transmits a message PFC-OFF to the user protocol of the relevant subscriber interface board 12, notifying that the flow control buffer has been restored to the normal status, and that the flow control has been released (232). Further, the main board 11 of the central station transmits a message PFC-OFF to the main board 21 of the terminal station having the flow control capability, notifying that the problem has been solved in the flow control buffer of the subscriber interface board 12 of the central station, and that now the data may be transmitted (233).

Upon termination of the flow control non-execution status, the subscriber interface board 12 of the central station transmits a response message PFC-OFF-RSP to the main board 11 of the central station (234).

Figure 2E:
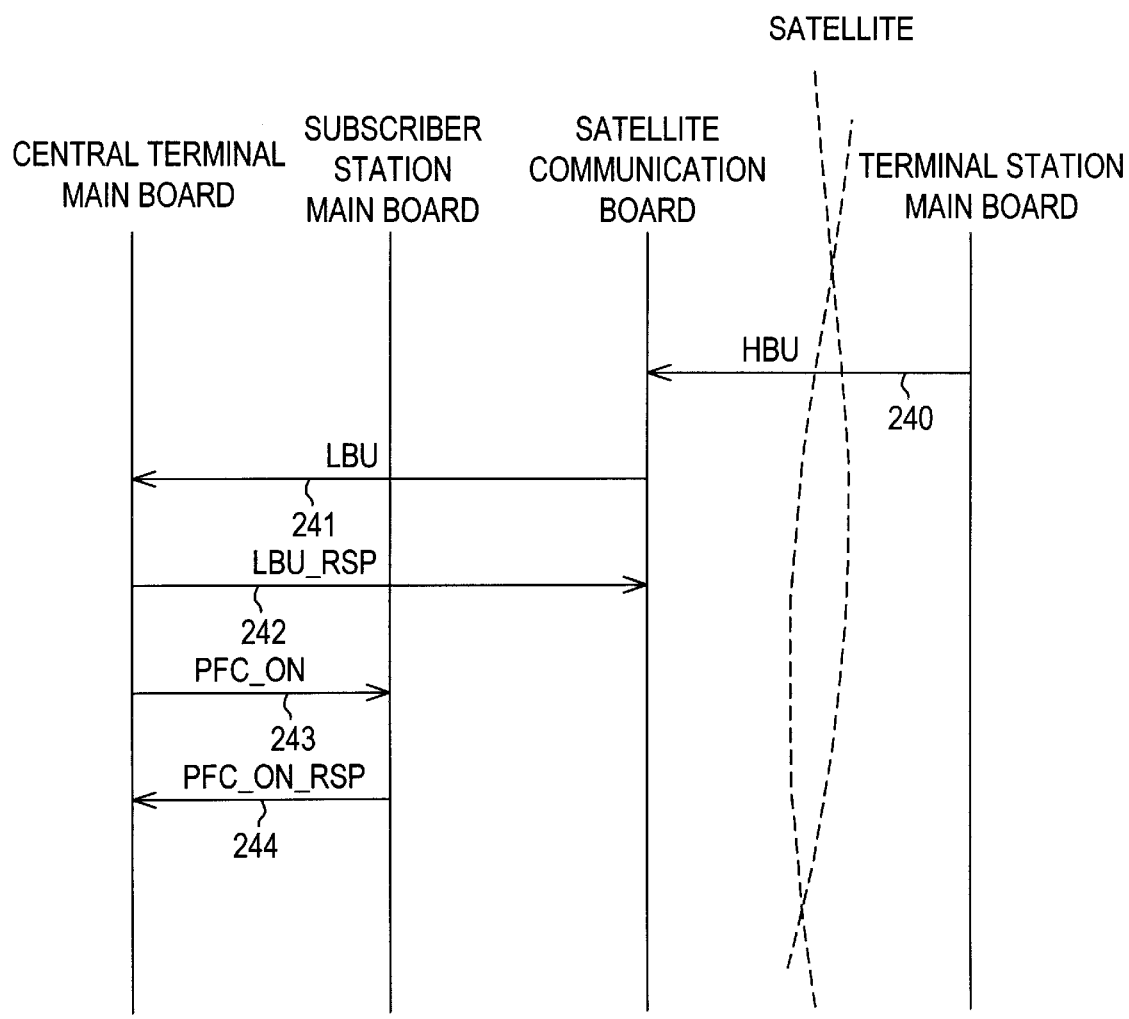

FIG. 2e is a message flow chart for the case where the main board 21 of the terminal station 20 has requested for an HBU flow control.

Referring to FIG. 2e, if the data of the buffer shows a value above a certain threshold value, the main board 21 of the terminal station transmits a high buffer utility message HBU to the satellite communication board 13 of the central station, notifying that the level of the flow control buffer has reached a value above the reference level (240). Upon receipt of the HBU message, the satellite communication board 13 of the central station transmits a high buffer utility message HBU to the main board 11 of the central station (241).

Upon receipt of the high buffer utility message HBU, the main board 11 of the central station sends a response message HBU-RSP to the satellite communication board 13 (242). Further, the main board 11 of the central station transmits a board flow control message PFC-ON to the subscriber interface board 12 of the central station having a user communication protocol (243).

The subscriber interface board 12 of the central station transmits a message to the respective communication protocols operating within its own board, notifying that the data cannot be transmitted due to a problem occurred in the board of the terminal station 20. Further, the subscriber interface board 12 of the central station transmits a response message PFC-RSP for the message PFC-ON to the main board 11 of the central station (244).

Figure 2F:
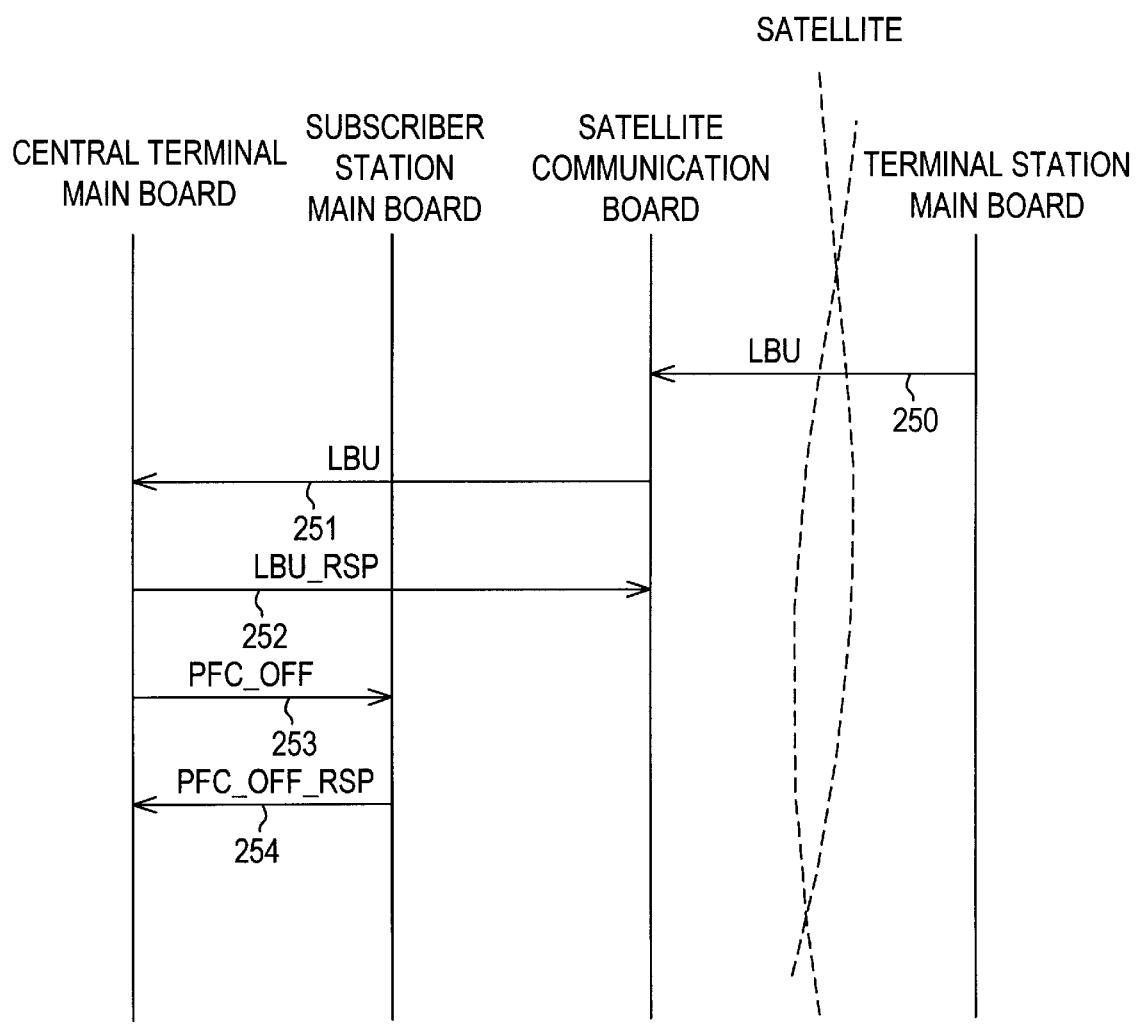

FIG. 2f is a message flow chart for the case where the main board 21 of the terminal station has requested for a high buffer utility flow control.

Referring to FIG. 2f, if the data of the buffer shows a value below a certain threshold value, the main board 21 of the terminal station transmits a low buffer utility message LBU to the satellite communication board 13 of the central station, notifying that the level of the flow control buffer has dropped to below the reference level (250). Further, the satellite communication board 13 of the central station transmits a low buffer utility message LBU to the main board 11 of the central station (251).

Then the main board 11 of the central station transmits a response message LBU-RSP for the message LBU to the satellite communication board 13 (252). Further, the main board 11 transmits a board flow control non-execution message PFC-OFF to the subscriber interface board 12 of the central station, notifying that now the data may be transmitted (253).

Meanwhile, the subscriber interface board 12 of the central station sends notices to the respective communication protocols of its own, notifying that the data may be transmitted owing to the solution of the problem. Further the subscriber interface board 12 sends a response message PFC-OFF-RSP for the above message to the main board of the central board 11 (254).

As shown in FIGS. 2a to 2f, the main board 11 of the central station perceives all the states of the flow controls, and sends commands to all the boards and to the relevant user protocol, so that they can execute the flow controls.

FIGS. 3a to 3d are flow chart for the case where the main board 11 of the central station has received a high buffer utility message HBU, a low buffer utility message LBU, a board flow control (BFC) response message, and a port flow control (PFC) response message.

Figure 3A:
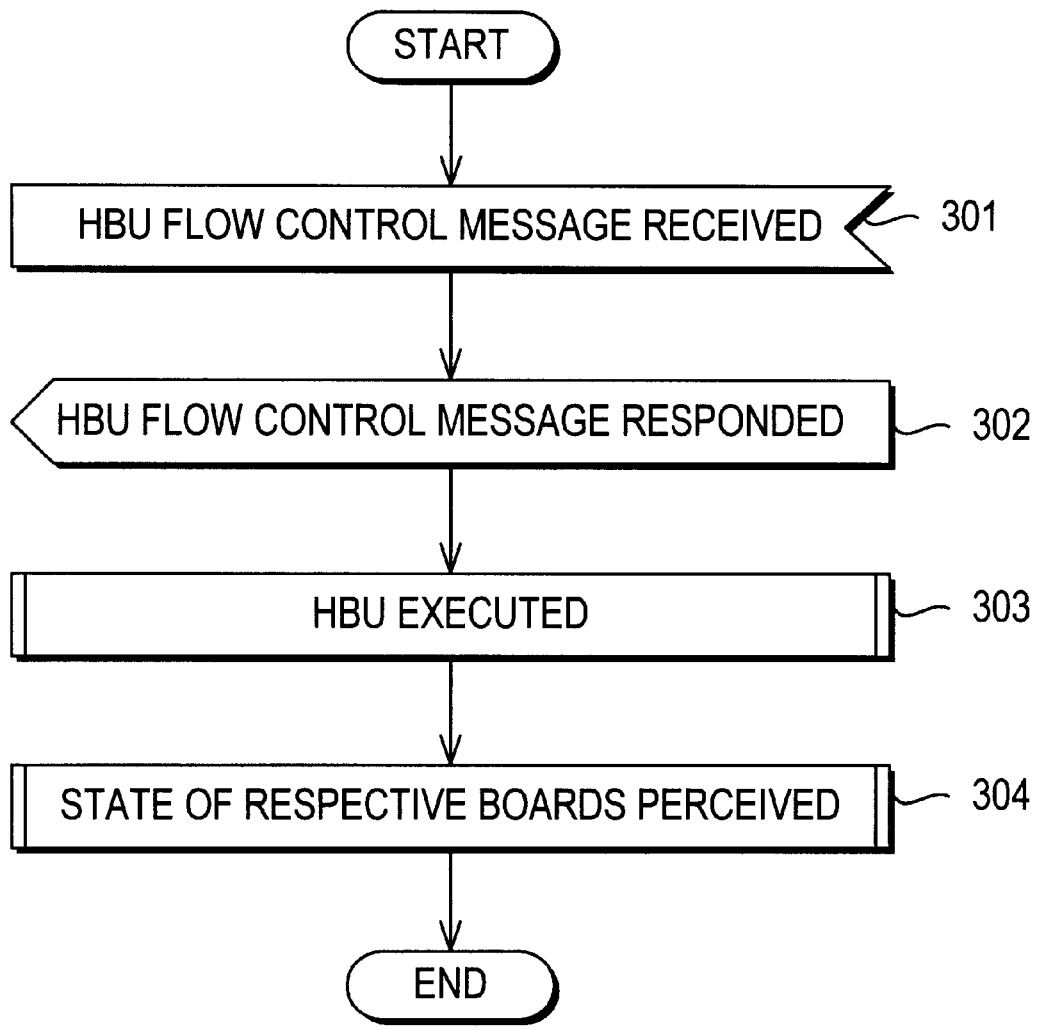
FIGS. 3a to 3d are flow charts showing the flow control method for the case where the main board of the central station has received a flow control message.

FIG. 3a is an execution flow chart for the case where the main board 11 of the central station has received a high buffer utility message HBU from another board.

If the main board 11 of the central board receives a high buffer utility message HBU from another board (the subscriber interface board 12, the satellite communication board 13 or the main board 21 of the terminal station) indicating that the flow control buffer has reached above a certain level (301), then the main board 11 of the central station transmits a flow control response message to the sending board (302), and executes the high buffer utility HBU (303). Under this condition, the relevant program is activated, so that the relevant flow control function among FIGS. 2a, 2c and 2e would be executed.

Further, the main board 11 of the central station checks the messages coming from the respective boards and the boards of the terminal station 20, and thus, perceives the statuses of the respective boards within the satellite communication system (304).

Figure 3B:
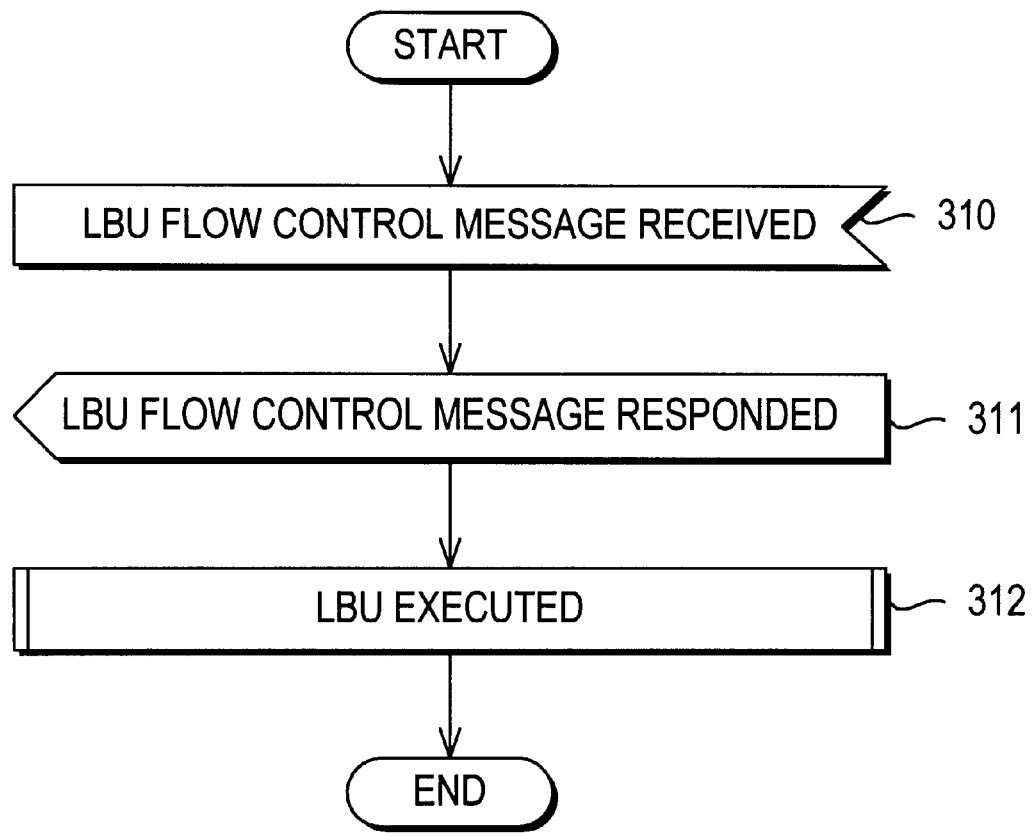

FIG. 3b is an execution flow chart for the case where the main board 11 of the central station has received a low buffer utility message LBU from another board.

If the main board 11 of the central board receives a low buffer utility message LBU from another board (the subscriber interface board 12, the satellite communication board 13 or the main board 21 of the terminal station) indicating that the flow control buffer has reached below a certain level (310), then the main board 11 of the central station transmits a flow control response message to the sending board (311), and executes the low buffer utility LBU (312). Under this condition, the relevant program is activated, so that the relevant flow control function among FIGS. 2b, 2d and 2f would be executed.

Figure 3C:
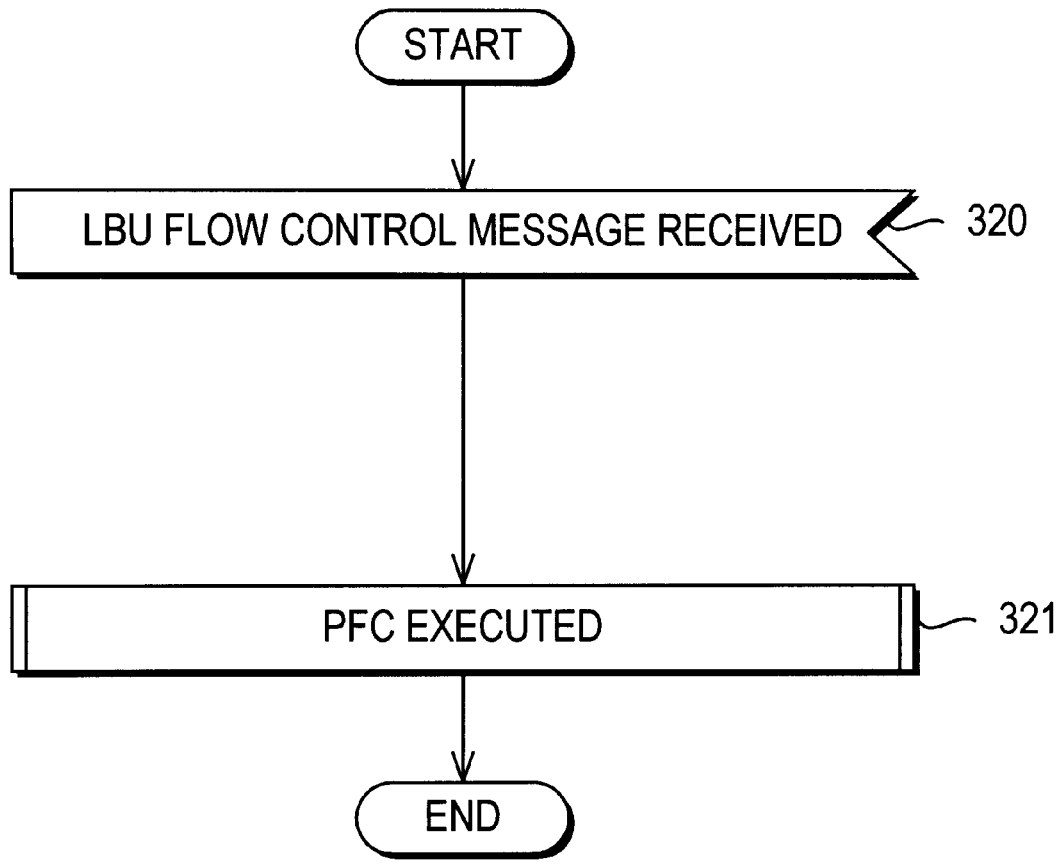

FIG. 3c is an execution flow chart for the case where the main board 11 of the central station has received a BCF response message. If the main board 11 of the central station receives a BCF flow control response message (320), a BFC is executed (321).

Figure 3D:
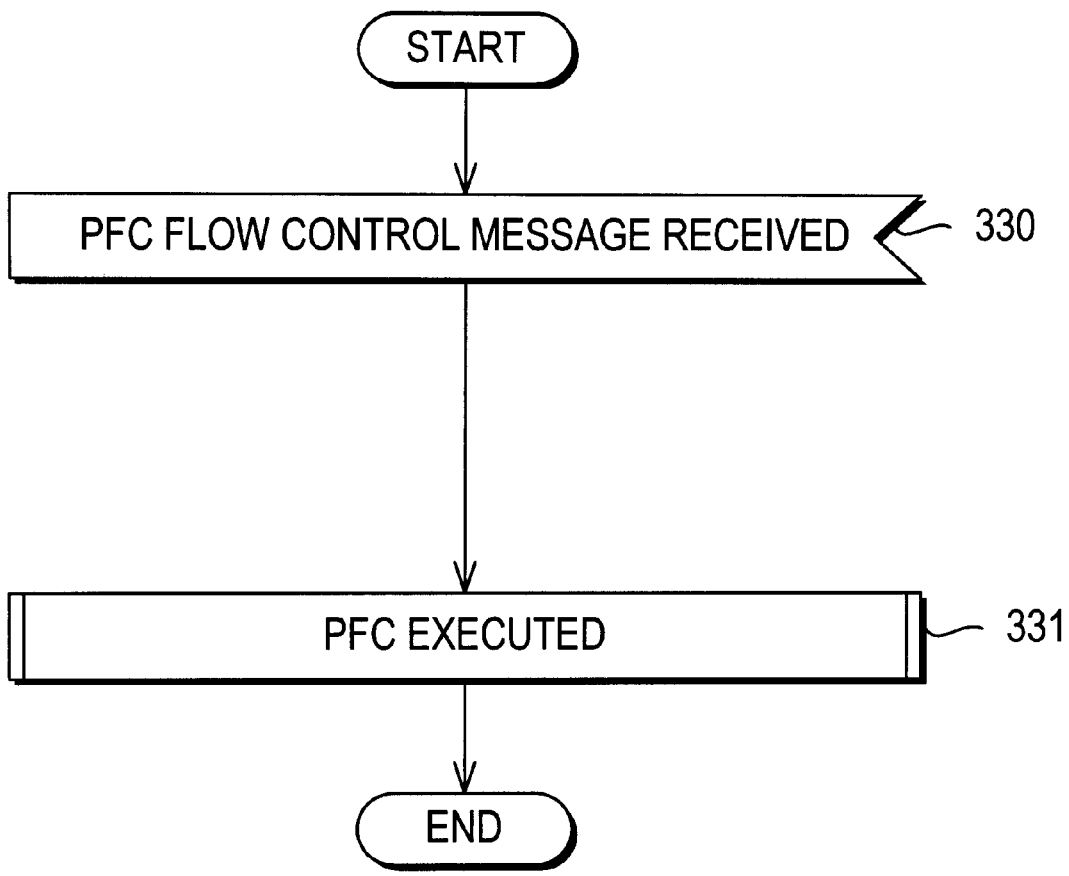

FIG. 3d is an execution flow chart for the case where the main board 11 of the central station has received a PFC response message. If the main board 11 of the central station receives a PFC flow control response message (330), a PFC is executed (331).

Finally FIGS. 4a, 4b, 5a and 5b are flow charts showing specific flow control methods carried out at the main board of the central station, which makes the respective boards of the satellite communication system execute flow controls. These drawings are detailed illustrations of the processing of the LBU and HBU of FIGS. 3a to 3d.

Figure 4A:
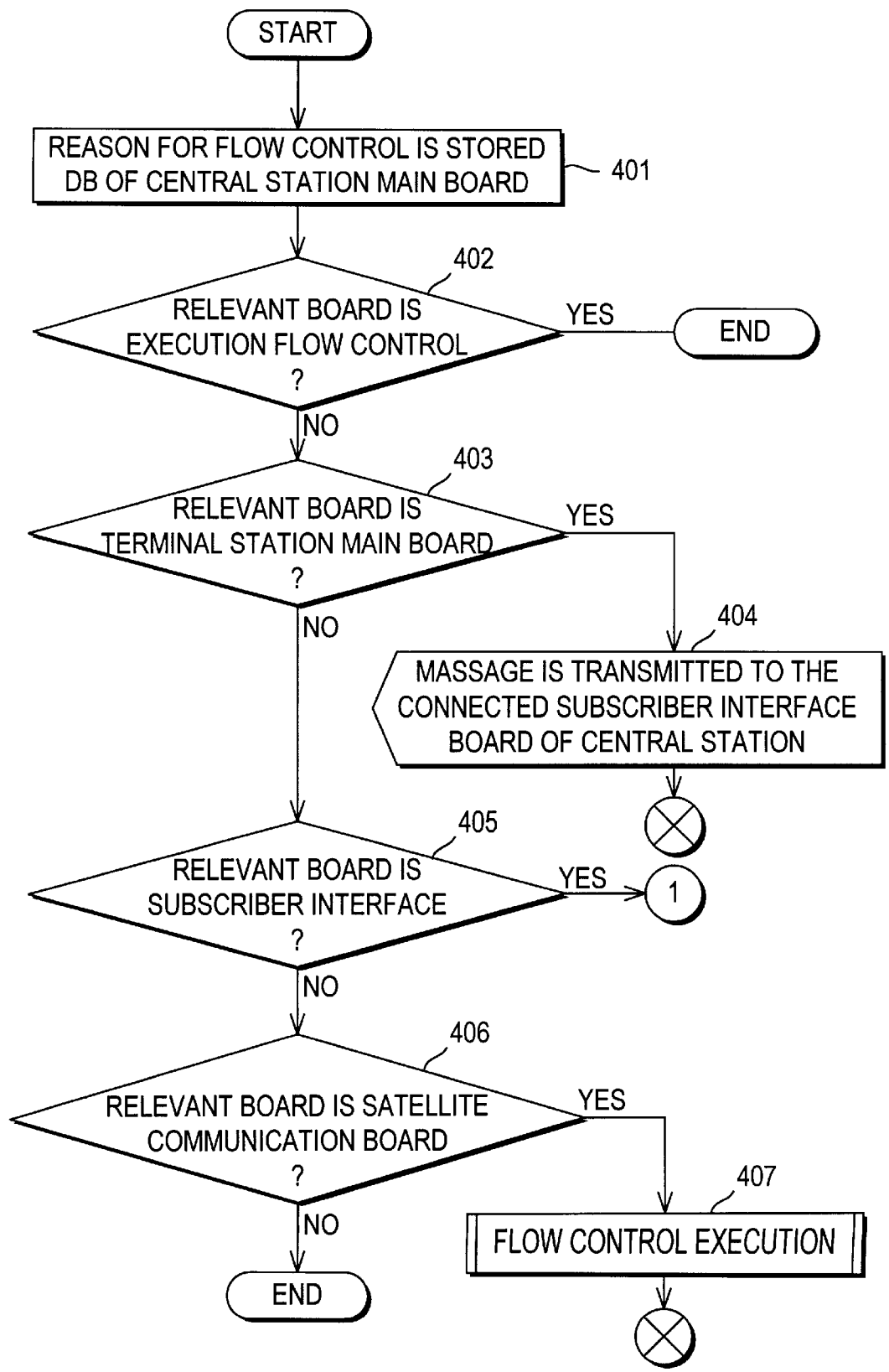
FIGS. 4a, 4b, 5a and 5b are flow charts showing specific flow control methods carried out at the main board of the central station according to the present invention.
Figure 4B:
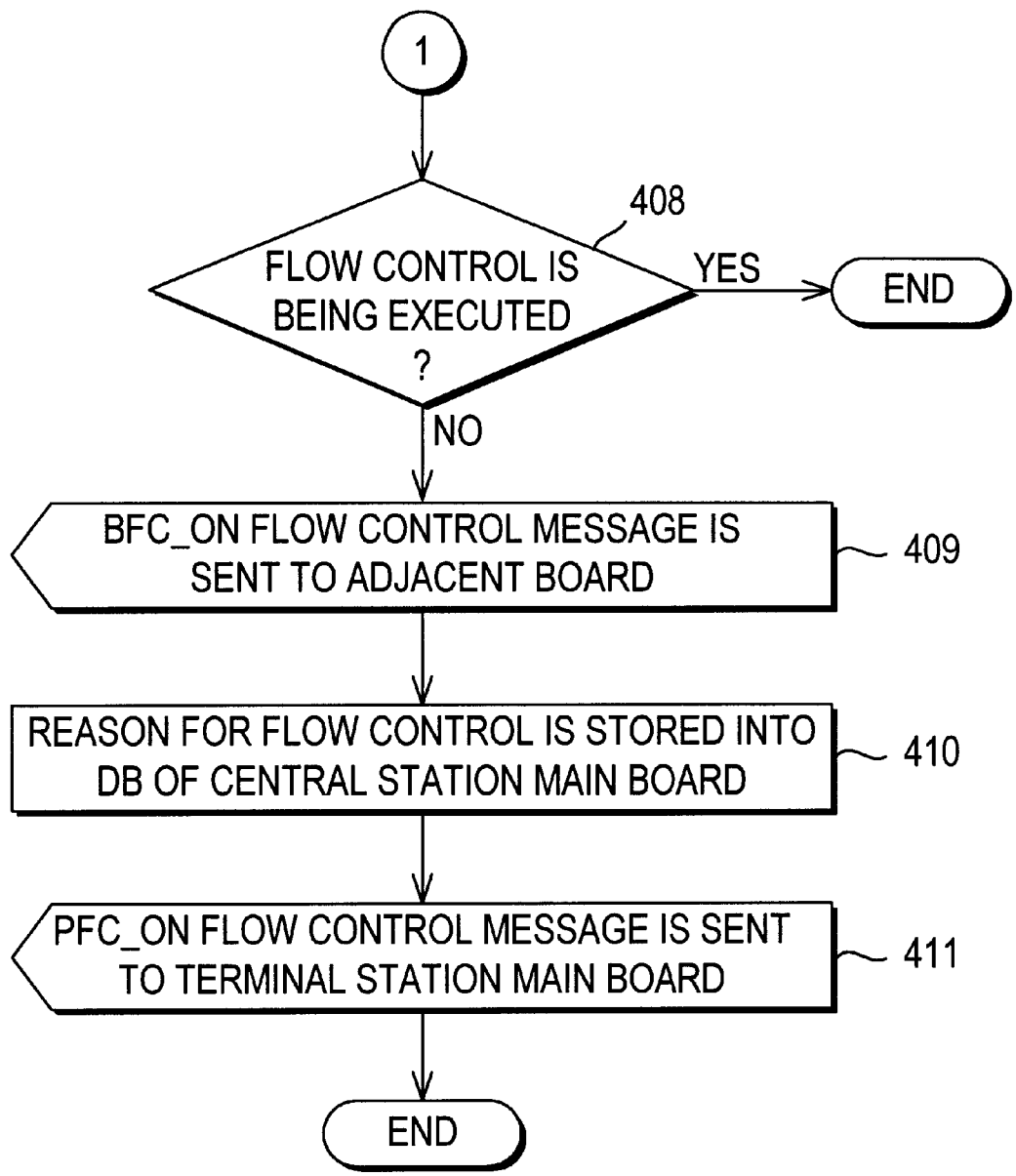

First, FIGS. 4a and 4b are execution flow charts for the case where the main board 11 of the central station has received an HBU message.

If a flow control occurs, the flow control function of the main board 11 of the central station records the reason for the flow control into the system data base of the main board 11 of the central station (401), and then checks as to whether the relevant board is executing the flow control (402). If it is executing the flow control, the checking is terminated, while if not, the relevant board is looked for (403, 405 and 406).

A checking is made as to whether the relevant board is the main board 21 of the terminal station (403), and if it is the main board 21 of the terminal station, then a message is transmitted to the subscriber interface board 12 (404). If the relevant board is the satellite communication board 13 of the central station, a flow control is executed (407).

Meanwhile, a checking is made as to whether the relevant board is the subscriber interface board 12 of the central station (405), and if it is the subscriber interface board 12, then a checking is made as to whether a flow control is being executed by the subscriber interface board 12 (408). If the flow control is being executed, the flow control is terminated. If a flow is not being executed, a board flow control message BFC-ON is transmitted to a nearby board (409).

Then the reason for the flow control is stored into the data base of the main board 11 of the central station (410), and a port flow control message PFC-ON is sent to the main board 21 of the terminal station (411).

Figure 5A:
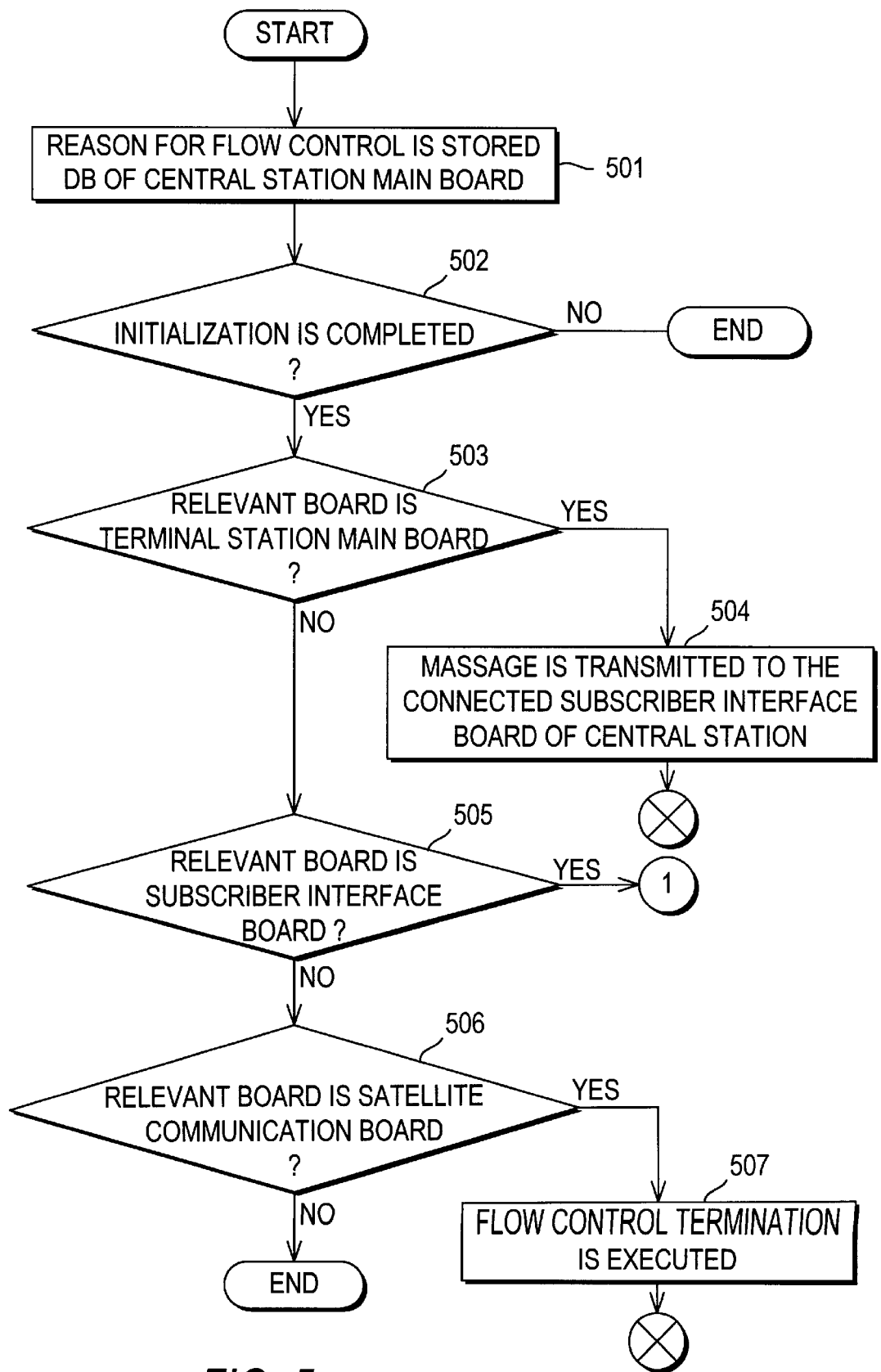
Figure 5B:
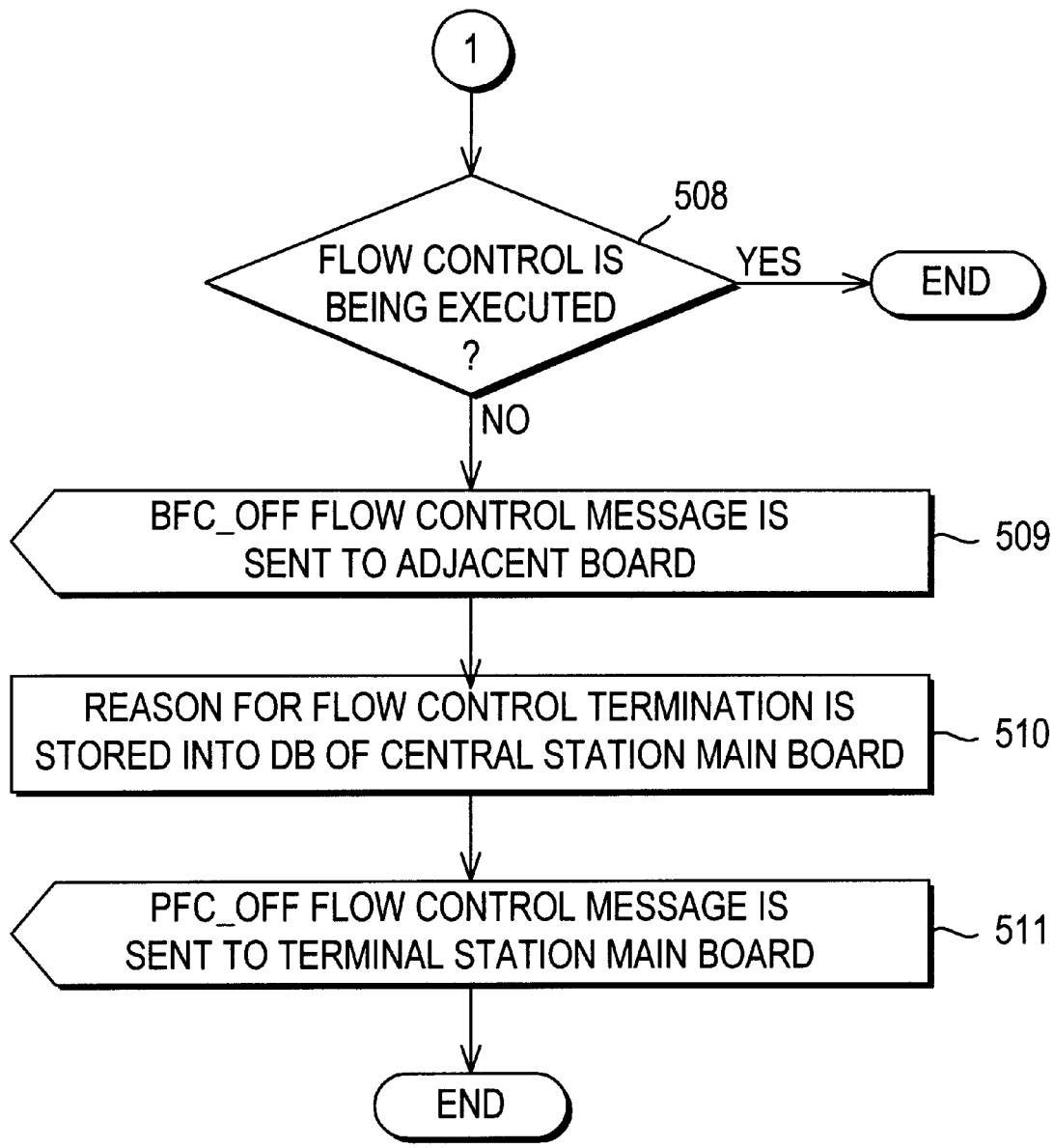

FIGS. 5a and 5b are flow control release flow chart for the case where the main board 11 of the central station has received an LBU message. These drawings illustrate the procedure when the cause of the flow control has been removed, and when the data transmission is resumed.

First, the data base of the main board 11 of the central station is initialized (501), and the initialization is confirmed (502).

Under this condition, if the initialization is not completed due to a residual reason for the flow control, then the flow control cannot be terminated. Therefore, the flow control releasing procedure is terminated, and waits until the flow control based on another reason is terminated. Then when the initialization is completed, the respective relevant boards are searched (503, 505 and 506).

That is, a checking is made as to whether the relevant board is the main board 21 of the terminal station (503), and if it is the main board 21 of the terminal station, then a port flow control termination message PFC-OFF is transmitted to the connected subscriber interface board 12 of the central station (504). If the relevant board is the satellite communication board 13 of the central station, then a flow control termination is executed (507). If the relevant board is the subscriber interface board 12 of the central station, a checking is made as to whether a flow control is currently being executed (508).

Under this condition, if a flow control is being executed, the flow control is terminated, while if not, a board flow control termination message BFC-OFF is transmitted to an adjacent board (509). Then the reason for the flow control release is stored into the data base of the main board 11 of the central station (510), and a board flow control termination message BFC-OFF is transmitted to the main board 21 of the terminal station (511).

It should be apparent to those ordinarily skilled in the art that various substitutions, modifications and changes can be made without departing from the scope of the present invention. Therefore, the present invention will not be limited to the specific embodiment and the drawings.

According to the present invention as described above, the data rush which frequently occurs during the data transmissions by utilizing the satellite communication can be prevented. Further, the data leakage which occurs during the shifting of the system status can be prevented.

What is claimed is:

1. A method for controlling transmission data flow in a satellite communication system, comprising the steps of:

storing a high buffer utility (HBU) (which occurs when a buffer data exceeds a threshold value) into a data base by a central station board upon receipt of it, and identifying a board which has sent the high buffer utility, so as to control a data flow of said board (first step); and initializing a relevant data base by said central station board upon receipt of a low buffer utility (LBU) when a buffer data has a value lower than a threshold value, and identifying a position of the board which has sent the low buffer utility, so as to control a data flow of said board (second step).

2. The method as claimed in claim 1, wherein, in the first step, in a case where a satellite communication board of said central station has sent a high buffer utility to a main board of said central station, a response signal for the high buffer utility is transmitted to said satellite communication board of said central station by said main board of said central station;

a fact that a board flow control and a port flow control are being executed is notified by said main board of said central station to a subscriber interface board of said central station, so that any more data cannot be transmitted; and a response signal for this fact is received from said subscriber interface board of said central station by said main board of said central station.

3. The method as claimed in claim 1, wherein, in the first step, in a case where said subscriber interface board of said central station has sent a high buffer utility to said main board of said central station, a response signal for the high buffer utility is sent to said subscriber interface board of said central station by said main board of said central station; and a fact that a port data flow control is being executed is notified by said main board of said central station to said main board of said terminal station, so that any more data cannot be transmitted from said main board of said terminal station.

4. The method as claimed in claim 1, wherein, in the first step, in a case where said main board of a terminal station has transmitted a high buffer utility to said main board of said central station, a response message for the high buffer utility is sent to said satellite communication board by said main board of said central station;

a fact that a port flow control is being executed is notified to said subscriber interface board of said central station by said main board of said central station; and a response message for this notification is received from said subscriber interface board by said main board of said central station.

5. The method as claimed in claim 1, wherein, in the second step, in a case where said satellite communication board of said central station has sent a low buffer utility to said main board of said central station, a response signal for the low buffer utility is transmitted to said satellite communication board of said central station by said main board of said central station;

a fact that a board flow control and a port flow control have been terminated is notified by said main board of said central station to said subscriber interface board of said central station, so as to make the data transmitted; and a response signal for this fact is received from said subscriber interface board of said central station by said main board of said central station.

6. The method as claimed in claim 1, wherein, in the second step, in a case where said subscriber interface board of said central station has sent a low buffer utility to said main board of said central station, a response signal for the low buffer utility is sent to said subscriber interface board of said central station by said main board of said central station;

a fact that a port flow control has been completed is notified by said main board of said central station to said subscriber interface board and to said main board of said terminal station, so that a transmission of data can be resumed; and a response signal for this fact is received from said subscriber interface board by said main board of said central station.

7. The method as claimed in claim 1, wherein, in the second step, in a case where said main board of a terminal station has sent a low buffer utility through said satellite communication board to said main board of said central station, a response signal for the low buffer utility is sent to said satellite communication board by said main board of said central station;

a fact that a port flow control has been completed is notified to said subscriber interface board of said central station by said main board of said central station; and a response signal for this fact is received from said subscriber interface board of said central station by said main board of said central station.

* * * * *